(12) United States Patent
Novelli et al.

(10) Patent No.: US 10,733,280 B2
(45) Date of Patent: Aug. 4, 2020

(54) CONTROL OF A MOBILE DEVICE BASED ON FINGERPRINT IDENTIFICATION

(71) Applicant: INTERNATIONAL BUSINESS MACHINES CORPORATION, Armonk, NY (US)

(72) Inventors: Ann Novelli, Wappingers Falls, NY (US); Adaoha Onyekwelu, Wappingers Falls, NY (US); Kevin Bruckner, Wappingers Falls, NY (US); Theresa Hans, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 15/997,732

(22) Filed: Jun. 5, 2018

(65) Prior Publication Data

US 2019/0370442 A1     Dec. 5, 2019

(51) Int. Cl.
*G06K 9/00*        (2006.01)
*G06F 21/32*     (2013.01)

(52) U.S. Cl.
CPC .......... *G06F 21/32* (2013.01); *G06K 9/0002* (2013.01); *G06K 9/00087* (2013.01); *G06F 2203/04808* (2013.01)

(58) Field of Classification Search
CPC .. G06F 21/32; G06K 9/0002; G06K 9/00087; G06K 9/00013; G06K 9/00006

(Continued)

(56) References Cited

U.S. PATENT DOCUMENTS 6,069,970 A    5/2000   Salatino et al.
6,459,804 B2   10/2002   Mainguet
(Continued)

FOREIGN PATENT DOCUMENTS

CN     105045488 A     11/2015
CN     105824434 A      8/2016
(Continued)

OTHER PUBLICATIONS

Anonymous "A Highly Usable and Highly Secure Access Method Combining Biometrics, Selection, and Sequence Into a Simple Two-Step Action", An IP.com Prior Art Database Technial Disclosure; IP.com No. IPCOM000229478D; Publication Date: Jul. 31, 2013; 4 pgs.

(Continued)

*Primary Examiner* — Charlotte M Baker
(74) *Attorney, Agent, or Firm* — Cantor Colburn LLP; Teddi Maranzano

(57) ABSTRACT

Methods, systems and computer program products for controlling a mobile device based on fingerprint identification are provided. Aspects includes detecting an input from a user via an input device of the mobile device, the input including a touch by at least two fingers of a plurality of fingers of a user and determining an operation state of the mobile device at a time of the detected input. Aspects also include identifying the at least two fingers used to apply the input by the user based on stored fingerprint data that differentiates between individual fingers of the user and identifying a command based on the operational state and based on the identified at least two fingers, the command identified from a plurality of different commands based on which of the individual fingers is identified. Aspects further include performing an action associated with the identified command.

17 Claims, 6 Drawing Sheets

200

(58) Field of Classification Search
USPC ........ 382/116, 124; 381/315, 314; 340/5.53, 340/5.83; 345/156, 158; 715/702, 709; 455/411
See application file for complete search history.

(56) References Cited

U.S. PATENT DOCUMENTS

| | | | |
|---|---|---|---|
| 6,898,301 B2 | 5/2005 | Iwanaga | |
| 8,995,564 B2 | 3/2015 | Liu et al. | |
| 9,007,304 B2* | 4/2015 | Bevilacqua | G06F 3/017 |
| | | | 345/156 |
| 9,465,818 B2* | 10/2016 | Kerr | G06F 16/51 |
| 9,646,438 B2 | 5/2017 | G | |
| 10,061,969 B2* | 8/2018 | Zhang | G06F 21/32 |
| 2006/0101281 A1 | 5/2006 | Zhang et al. | |
| 2013/0307818 A1 | 11/2013 | Pope et al. | |
| 2016/0216823 A1 | 7/2016 | Setlak | |
| 2016/0227010 A1* | 8/2016 | Jung | G06F 3/14 |
| 2016/0267313 A1 | 9/2016 | Pope et al. | |
| 2017/0177797 A1* | 6/2017 | Kurniawan | H04L 63/20 |

FOREIGN PATENT DOCUMENTS

| | | |
|---|---|---|
| CN | 105825172 A | 8/2016 |
| WO | 2017173575 A1 | 10/2017 |

OTHER PUBLICATIONS

Anonymous "Password Mechanism based on Selective Fingerprint Feature" An IP.com Prior Art Database Technical Disclosure; IP.com No. IPCOM000236829D; Publication Date: May 19, 2014; 8 pgs.

* cited by examiner

CONTROL OF A MOBILE DEVICE BASED ON FINGERPRINT IDENTIFICATION

BACKGROUND

The present invention relates generally to controlling a mobile device, and more specifically, to performing actions on a mobile device based on fingerprint identification and device characteristics.

Touchscreens have become increasing popular features of computing devices, particularly of portable or mobile devices, such as tablets and smartphones. Users typically interact with touchscreens by controlling processing operations using various gestures, such as stationary touches and swipes. As these devices become more complex and capable of performing a larger number of functions, new methods of controlling the devices are needed.

SUMMARY

An embodiment of a computer implemented method for controlling a mobile device based on fingerprint identification are provided. The method includes detecting an input from a user via an input device of the mobile device, the input including a touch by at least two fingers of a plurality of fingers of a user and determining an operation state of the mobile device at a time of the detected input. The method also includes identifying the at least two fingers used to apply the input by the user based on stored fingerprint data that differentiates between individual fingers of the user and identifying a command based on the operational state and based on the identified at least two fingers, the command identified from a plurality of different commands based on which of the individual fingers is identified. The method further includes performing an action associated with the identified command.

An embodiment of an apparatus for performing a processing action includes an input device configured to receive an input from a user, the input including a touch by at least two fingers of a plurality of fingers of the user, a touch sensor configured to detect the touch by the user, and a finger pattern sensor configured to measure at least part of a fingerprint of the at least one finger. The apparatus also includes a processing device configured to perform detecting the input from the user via the touch sensor and determining an operation state of the mobile device at a time of the detected input. The processing device is also configured to perform identifying the at least two fingers used to apply the input by the user based on stored fingerprint data that differentiates between individual fingers of the user and identifying a command based on the operational state and based on the identified at least two fingers, the command identified from a plurality of different commands based on which of the individual fingers is identified. The processing device is further configured to perform the processing action associated with the identified command.

An embodiment of a computer program product for performing a processing action includes a computer readable storage medium having program instructions embodied therewith, the program instructions readable by a processing circuit to cause the processing circuit to perform a method. The method includes detecting an input from a user via an input device of the mobile device, the input including a touch by at least two fingers of a plurality of fingers of a user and determining an operation state of the mobile device at a time of the detected input. The method also includes identifying the at least two fingers used to apply the input by the user based on stored fingerprint data that differentiates between individual fingers of the user and identifying a command based on the operational state and based on the identified at least two fingers, the command identified from a plurality of different commands based on which of the individual fingers is identified. The method further includes performing an action associated with the identified command.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Apparatuses, systems, and methods are provided for detecting user inputs on a mobile device and responsively perform processing and/or display actions. In one embodiment, a mobile device, such as a smartphone, is configured to detect an input from a user, such as a touch by at least two fingers of a plurality of fingers of the user. The mobile device includes a touch sensor for detecting a user input and a finger pattern sensor for detecting a finger print, a portion of a fingerprint, combinations of features or other patterns discernable for differentiating between different users and different fingers of an individual user.

The mobile device is configured to measure at least part of a fingerprint of the fingers used by the user to apply the input and to identify the individual fingers used. The combination of the identification of the fingers and additional information regarding one or more characteristics of the mobile device, such as the state of the mobile device, are associated with a specific action to be performed by the processing unit of the mobile device.

The embodiments described herein present enhanced functionality and ability to quickly and efficiently execute a large number of actions based on different inputs. By differentiating between each finger of a user, an input with one finger (e.g., an index finger) can prompt a specific action, while the same input with a different finger (e.g., a middle or ring finger) can be used to prompt a completely different action. Likewise, the input with fingers when the device is in a different state, a different location, or in a different orientation can be used to prompt a completely different action.

Figure 1:
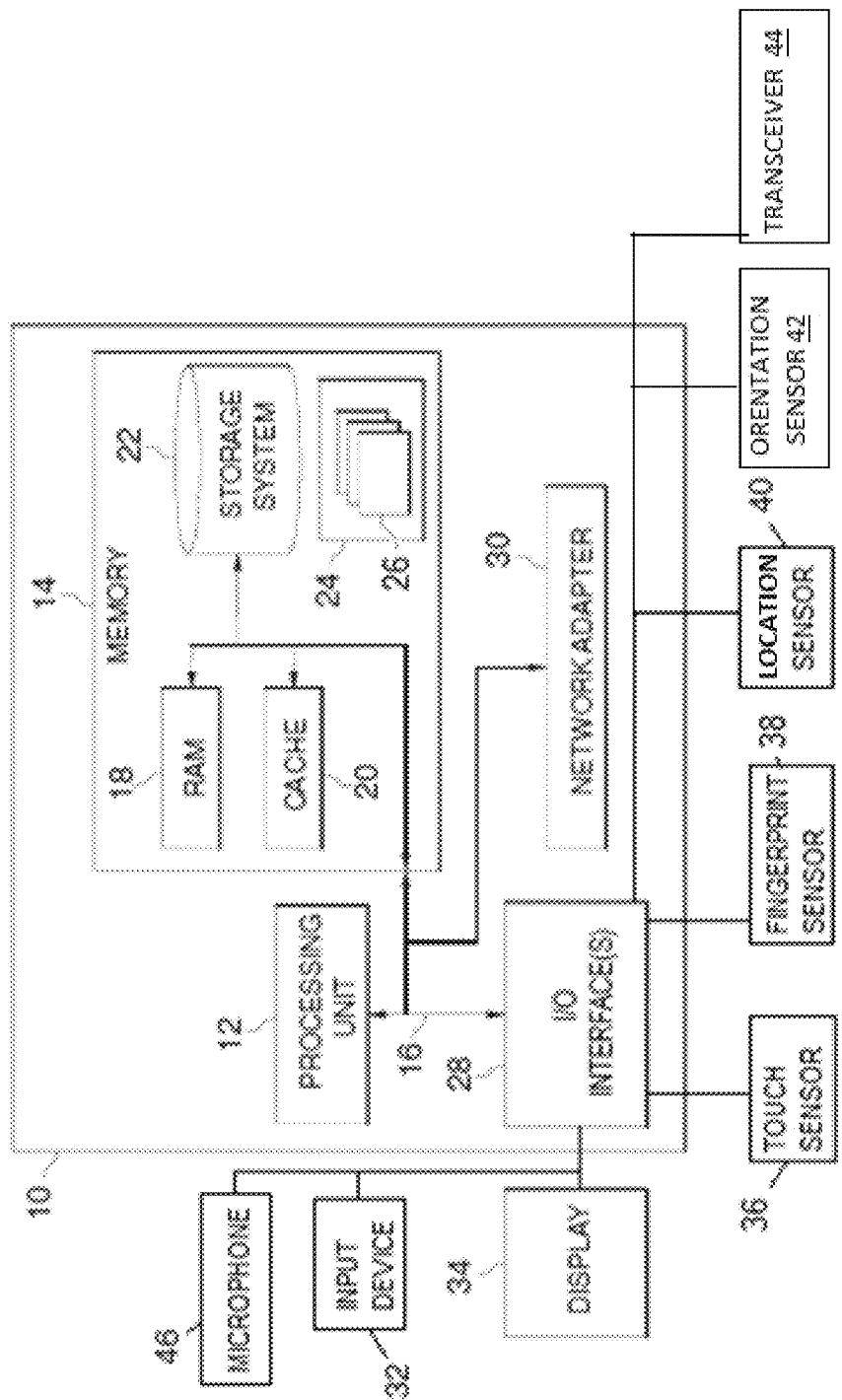
FIG. 1 depicts a block diagram of a mobile device in accordance with an embodiment.

FIG. 1 illustrates an example of a mobile device 10 that can be used to perform various actions, including receiving and processing user inputs and performing various processing actions as described herein, including storing and processing data, executing programs and displaying information. The mobile device 10 may be configured to receive or gather communications (e.g., data, text, spoken words, emails, authentication information, etc.) from other locations, such as a network (e.g., Internet) and/or another processor (e.g., server, computer or mobile device). The mobile device 10 may be any device capable of receiving user input, performing processing actions and displaying text and other information to a user, such as a mobile device (e.g., a smartphone), a wearable device (e.g., a smartwatch and/or fitness tracker), a tablet computer, a laptop computer, a desktop computer, a mainframe a server and others.

The mobile device 10 includes various components and/or modules for performing various processing, sensing and display functions. The mobile device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The mobile device 10 may also include other removable/non-removable, volatile/non-volatile computer system storage media. For example, the memory 14 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein.

The mobile device 10 includes or is connected to various components, which may be incorporated in the mobile device 10 or external to the mobile device 10. The mobile device 10 includes interfaces 28 for communication with components and may also include a network adapter 30 for communication with other devices or components over a suitable network or remote connection. The mobile device 10 is connected to or includes at least one input device 32 such as a keyboard, button, mouse and/or touchscreen, and a display 34. The components shown in FIG. 1 and described herein are provided for illustrative purposes and are not intended to be limiting.

The mobile device 10 also includes a touch sensor 36 that is configured to detect contact and/or pressure from a user, e.g., via one or more fingers and/or other input devices such as styluses. The touch sensor 36 detects not only finger position, but also movements along a touchscreen. Movements of a finger or finger used an input to the mobile device 10 are referred to herein as movements, motions or swipes. In this way, the touch sensor 36 may be used by the mobile device 10, e.g., in conjunction with other input devices and program modules 26, to recognize an input performed by a user.

As described herein, an input refers to any interaction between a user and a touchscreen or other input device. An input may be a touch at some location on the touchscreen by an object (e.g., one or more fingers), a movement or swipe of the touching object or a combination thereof. The movement may include an extent (e.g., the distance along a path of the touch), speed and/or path of the movement along the touchscreen. Other aspects of an input may include, for example, an amount of pressure, a number of touches (e.g., single "click" or double click), and any other criteria that may be used to discern the nature of the input and differentiate it relative to other inputs.

Any suitable type of touch sensor 36 may be included in the device. For example, the touch sensor 36 is a capacitive or acoustic wave sensor. The touch sensor 36 may be located under a touchscreen or embedded within the touchscreen (e.g., between screen layers).

The mobile device 10 also includes a biometric finger pattern sensor 38 that is configured to detect characteristics of the user's fingers, such as a fingerprint, portion of a fingerprint, or another characteristic that allows, e.g., identification of a user and/or differentiation between the individual fingers of a user. Such characteristics, whether utilized individually or in combination, are referred to herein as "finger patterns." A "finger pattern" refers to any detectable feature or features, or any other identifying information detected by the finger pattern sensor that can be used to identify characteristics of individual fingers of a user's hand and/or differentiate between fingers.

Although the finger pattern sensor 38 may be configured solely to detect fingerprints or other finger patterns, it may also detect other characteristics of a user, such as a temperature, vein pattern, and heartrate. One or more of these additional characteristics may be used in conjunction with fingerprint patterns to identify a user and/or differentiate between a user's fingers. An example of a fingerprint pattern sensor is a capacitive sensor. The finger pattern sensor 38, in one example, is embedded in or below a touchscreen or a portion of a touchscreen.

In addition to finger pattern information, one or more sensors can be included for measuring other biometric information, such as types of finger movement (e.g., swiping, finger pressure, finger rolling), and vital signs (e.g., heart rate and temperature). It is noted that the touch sensor and fingerprint sensor may be configured as individual sensors or sensor assemblies, or integrated into a common sensor assembly that is used by various processing modules to detect gestures and analyze fingerprint patterns.

Various other components may be incorporated in the mobile device 10. For example, a location sensor 40 can be used for determining the location of the mobile device 10. An orientation sensor 42 can be used for determining the orientation of the mobile device 10. The orientation can include whether the mobile device is in a landscape or portrait orientation and can also include determining if the mobile device is being held by the user. The transceiver 44 is configured to directly communicate with one or more electronic devices via any known protocol, such a Bluetooth. The one or more electronic devices can include a speaker or headset, a smartwatch, a television, a computer, an automobile, or the like. A microphone 46 or other sound recording device may be included for recording voice commands and recording changes in voice or other audible indicators.

The mobile device 10 is configured to perform various actions in response to user inputs, based on a combination of the nature of the input (e.g., position, number of fingers), an identification of at least a portion of a finger pattern of a user and one or more of an operation state of the mobile device, an orientation of the mobile device, a location of the mobile device, and a second electronic device in communication with the mobile device.

In one embodiment, the mobile device 10 is configured to, in response to detecting an input by a user (e.g., by detecting contact between a user's finger or fingers), identify the finger or fingers used via the finger pattern sensor 38. The mobile device 10 is further configured to determine one or more of an operation state of the mobile device, an orientation of the mobile device, a location of the mobile device, and a second electronic device in communication with the mobile device, in response to detecting an input by a user. Next, the mobile device 10 determines an action to be performed based on the input, the specific fingers used to perform the input and one or more of the orientation of the mobile device, the location of the mobile device, and the second electronic device in communication with the mobile device. This mapping of actions to be performed by mobile device 10 based on a variety of factors, greatly increases the number of possible input combinations that can be identified.

In exemplary embodiments, all or a portion of the display area is configured both as a touchscreen and a finger pattern sensor. For example, capacitive detection circuity is embedded under or within the screen to allow for detection of both touches as well as detection of finger patterns (e.g., fingerprints, portions of fingerprints and/or feature combinations associated with fingerprints). Detection of finger patterns provides functionality to identify a user for authentication or security purposes and to differentiate between different fingers of a user's hand. Furthermore, the finger pattern sensor may be configured to allow for detection of different portions of an individual finger, so that inputs such as finger rolling can be identified and/or different portions of an individual finger can be associated with different respective actions (e.g., using the side of a finger can denote a different action than using the finger in a normal manner). A finger pattern sensor can also be incorporated into other input devices, such as in one or more buttons. In this way, buttons can be given additional functionality by inputting different commands based on which finger is being used to press a button.

In exemplary embodiments, the processing unit 12 is configured to determine an appropriate command or action to be performed in response to a particular combination of a user inputs, a fingerprint identification, and characteristics of the mobile device. In one embodiment, the processing unit 12 communicates with one or more databases stored in the memory 14. The one or more databases stores data (such as in a table or other suitable data structure) that associates different combinations of user inputs, fingerprint identifications, and characteristics of the mobile device with respective commands or actions. The command or actions associated with a given combination can be pre-selected by the mobile device 10, or selected by a user during a setup or calibration operation.

Figure 2:
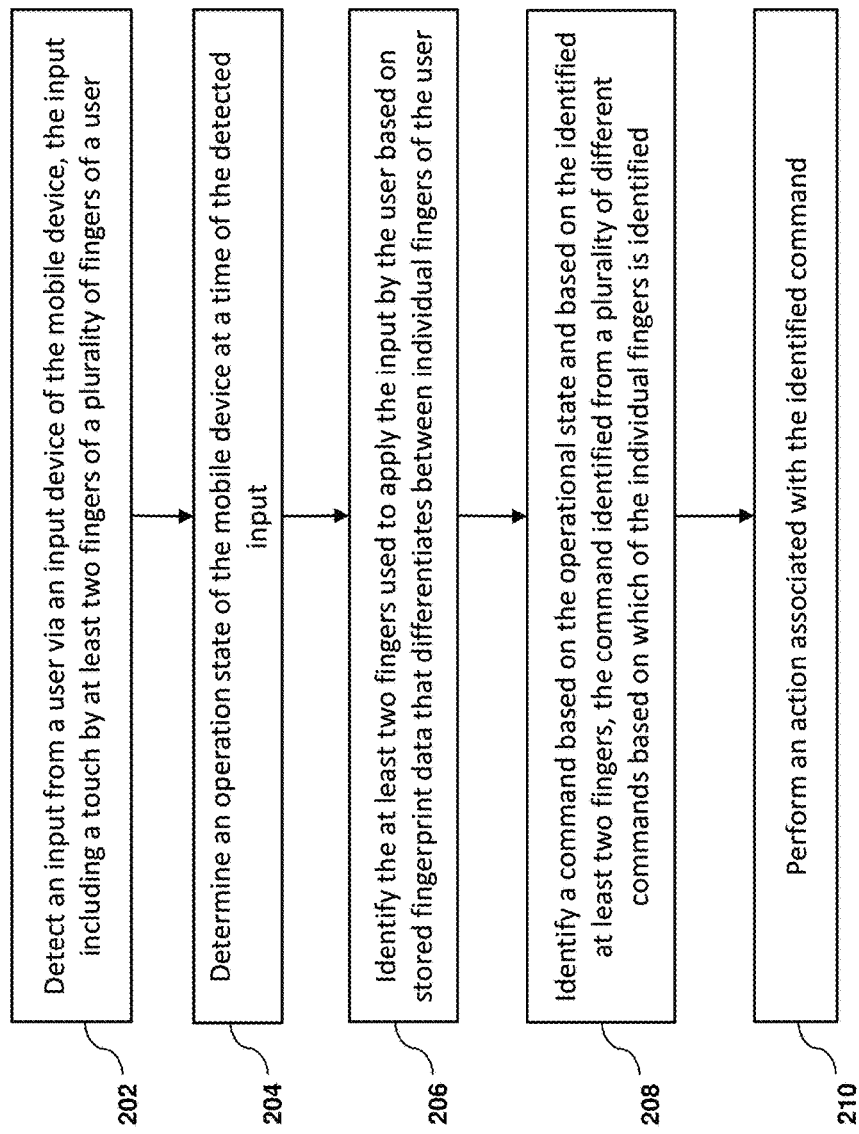
FIG. 2 depicts a flow diagram of a method for controlling a mobile device based in part on fingerprint identification in accordance with an embodiment.

FIG. 2 illustrates an embodiment of a method 200 for controlling a mobile device based in part upon fingerprint identification. As illustrated at block 202, the method 200 includes detecting an input from a user via an input device of the mobile device, the input including a touch by at least two fingers of a plurality of fingers of a user. Next, as shown at block 204, the method 200 includes determining an operation state of the mobile device at a time of the detected input. The operational state includes whether the mobile device is in a locked or unlocked state and if the mobile device is in an unlocked state the operational state includes an identification of an active application being executed by the mobile device. The method 200 also includes identifying the at least two fingers used to apply the input by the user based on stored fingerprint data that differentiates between individual fingers of the user, as shown at block 206

Next, as shown at block 208, the method includes identifying a command based on the operational state and based on the identified at least two fingers. The command is identified from a plurality of different commands based on which of the fingers is identified and optionally based on the detected locations of the at least two fingers. The method 200 also includes performing an action associated with the identified command, as shown at block 210. For example, if a user places their left index finger and left middle finger on the left center of the touch screen when the mobile device is unlocked and a web browser application is the active application, the mobile device will execute a go to the previous webpage action. If a user places their left index finger and left middle finger on the left center of the touch screen when the mobile device is locked, the mobile device will unlock the phone and launch a messaging application. In exemplary embodiments, the commands associated with the operational state and the various user inputs may be default commands determined by application developers or the commands may be associated with the various inputs by the user using the user interface of the mobile device, as shown and described with reference to FIGS. 4A, 4B, 4C, 5A, 5B and 5C.

Figure 3:
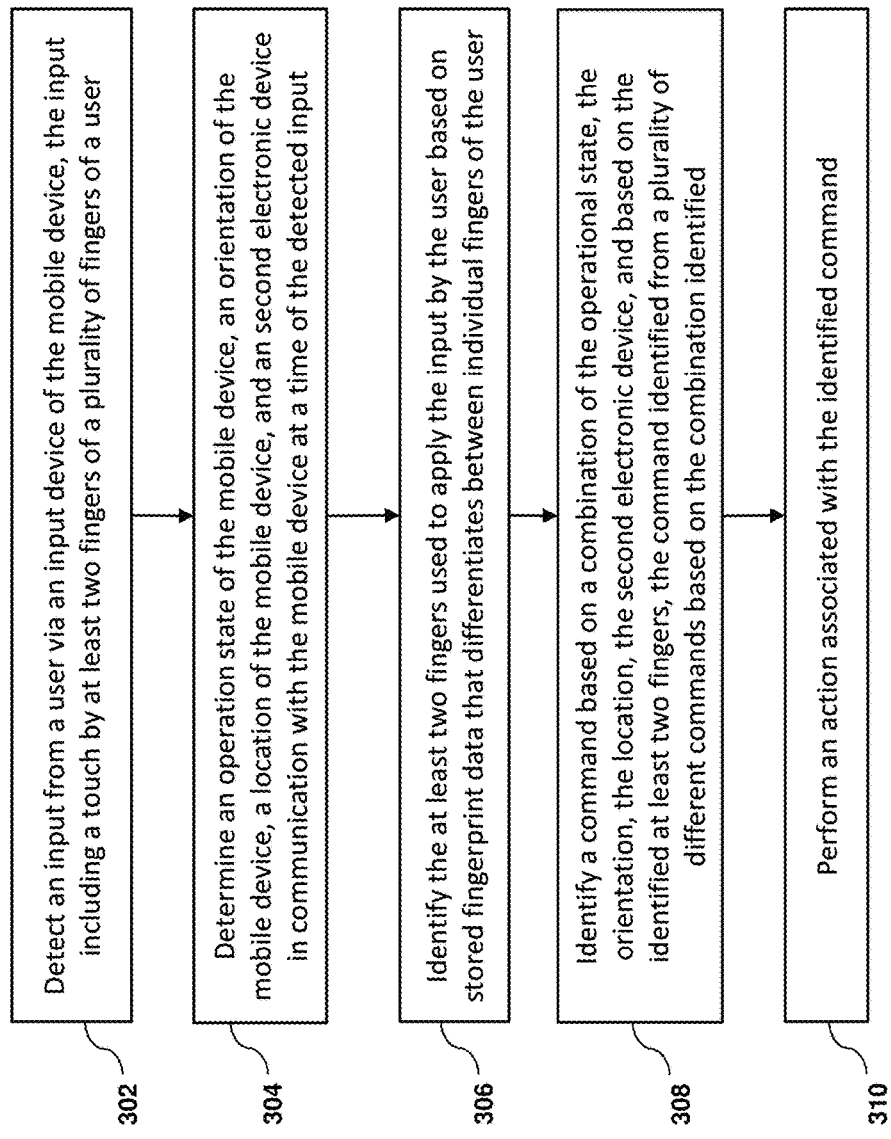
FIG. 3 depicts a flow diagram of another method for controlling a mobile device based in part on fingerprint identification in accordance with an embodiment.

FIG. 3 illustrates an embodiment of a method 300 for controlling a mobile device based in part upon fingerprint identification. As illustrated at block 302, the method 300 includes detecting an input from a user via an input device of the mobile device, the input including a touch by at least two fingers of a plurality of fingers of a user. Next, as shown at block 304, the method 300 includes determining an operation state of the mobile device, an orientation of the mobile device, a location of the mobile device, and a second electronic device in communication with the mobile device at a time of the detected input. The operational state includes whether the mobile device is in a locked or unlocked state and if the mobile device is in an unlocked state the operational state includes an identification of an active application being executed by the mobile device. The orientation of the mobile device can include whether the mobile device is in a landscape or portrait orientation and can also include determining if the mobile device is being held by the user. The location of the mobile device can be determined by a GPS receiver, an identification of a wireless network the mobile device is connected to, or the like. The one or more electronic devices can include a speaker or headset, a smartwatch, a television, a computer, an automobile, or the like.

The method 300 also includes identifying the at least two fingers used to apply the input by the user based on stored fingerprint data that differentiates between the fingers of the user, as shown at block 306. Next, as shown at block 308, the method 300 includes identifying a command based on a combination of the operational state of the mobile device, the orientation of the mobile device, the location of the mobile device, the second electronic device in communication with the mobile device, and based on the identified at least two fingers, the command identified from a plurality of different commands based on the combination identified. The method 300 also includes performing an action associated with the identified command, as shown at block 310.

In exemplary embodiments, users can create specific associations that will allow the user to quickly instruct the mobile device to perform the desired action by taking simple input actions. For example, if a user of the mobile device is in their car and their mobile device is connected to the car via Bluetooth, the user may instruct the phone to place a call to various individuals by simply placing specific fingers on a predetermined location on the screen. The associations between the characteristics of the mobile device, i.e., its operational state, its orientation, it location, devices it is communicating with can all be used in combination with the identification of the users fingerprints to greatly reduce the number of steps that a user must take to instruct the mobile device to perform the desired action.

In exemplary embodiments, the mobile device is configured to determine how many fingers have been used by the user on the touchscreen, and also identifies which finger by accessing stored data that associates individual finger patterns with individual fingers. For example, the mobile device determines that one finger was used, and identifies that the finger was the thumb, index finger, middle finger, ring finger or pinky (little or fourth) finger. If multiple fingers were detected, the device will determine both the number of fingers and an identification of the individual fingers. In addition to differentiating between fingers on one hand, the mobile device can also differentiate between different hands. For example, the index finger on the right hand is differentiated from the index finger of the left hand. In this way, touching the screen with a user's left hand finger can trigger a different action than touching the screen with the user' right hand.

For example, the user touches the mobile device touchscreen with two of his fingers. Depending on which fingers are used to touch the mobile device and based on the characteristics of the mobile device, the processing device determines which specific action is to be performed as described further below. In one example, the user touches the touchscreen of a locked mobile device with a left index finger and left middle finger to open a selected application. Touching the touchscreen with a right index finger and/the left index finger when the mobile device is locked would prompt a different action, e.g., opening a different application.

In exemplary embodiments, the processing device is configured to detect a finger pattern of the finger(s) applied to the touchscreen, such as a fingerprint or features (e.g., markers) associated with a fingerprint. The finger pattern is used to optionally identify the user and to identify the specific finger of the user. In some instances, the user has already been identified, e.g., based on previous inputs, and as such an explicit identification is not necessary. An example of a finger pattern is a fingerprint or portion thereof. The fingerprint may be a full image of a fingerprint or may be a set of constituent features that enable finger differentiation. Such features include, for example, locations where ridges and lines end, or where a ridge splits in two. A finger may be identified by matching some group of features with stored features associated with the user and finger. The finger pattern is used to determine which finger or fingers was/were applied, and optionally identifies and authenticates the user. For example, a fingerprint module receives a signal from a finger pattern sensor, estimates the finger pattern, and correlates the finger pattern with a user or provides the finger pattern to the processing unit.

Figure 4C:
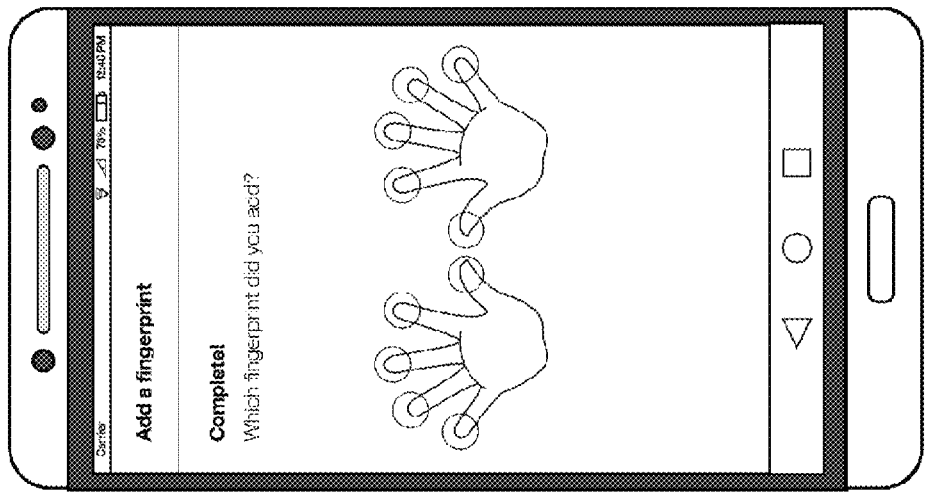
FIGS. 4A, 4B, and 4C depict user interfaces of a mobile device for capturing a fingerprint for association with an action of the mobile device in accordance with an embodiment.
Figure 4B:
Figure 4A:
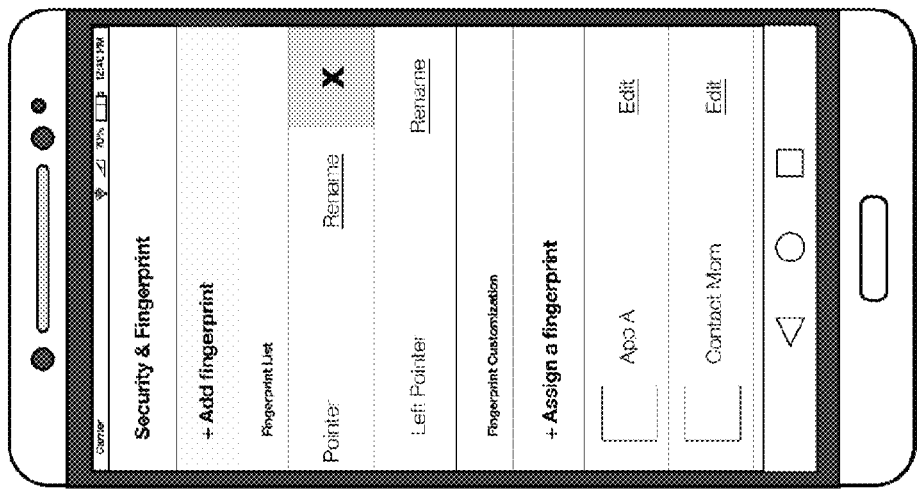

Referring now to FIGS. 4A, 4B and 4C user interfaces of a mobile device for capturing a fingerprint for association with an action of the mobile device in accordance with an embodiment are shown. As shown in FIG. 4A, the user interface can be used to create an association between a detected user fingerprints and the desired action. As shown in FIGS. 4B and 4C, the user interface can be used to receive a fingerprint from a user and to store an indication of which fingerprint the finger is associated with.

Figure 5C:
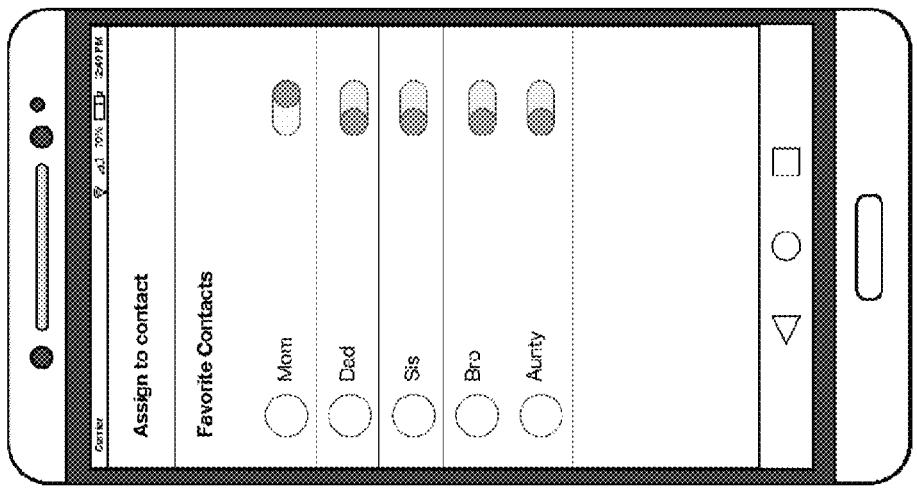
FIGS. 5A, 5B, and 5C depict user interfaces of a mobile device for associating a fingerprint with an action of the mobile device in accordance with an embodiment.
Figure 5B:
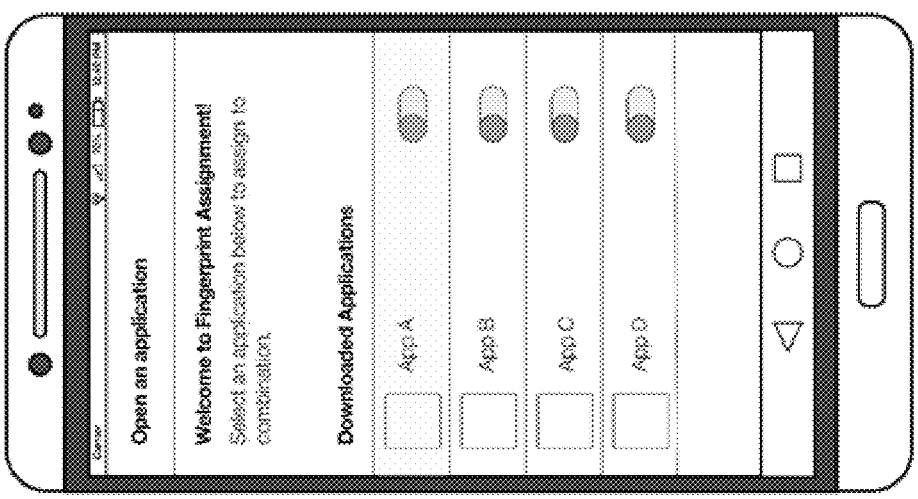
Figure 5A:
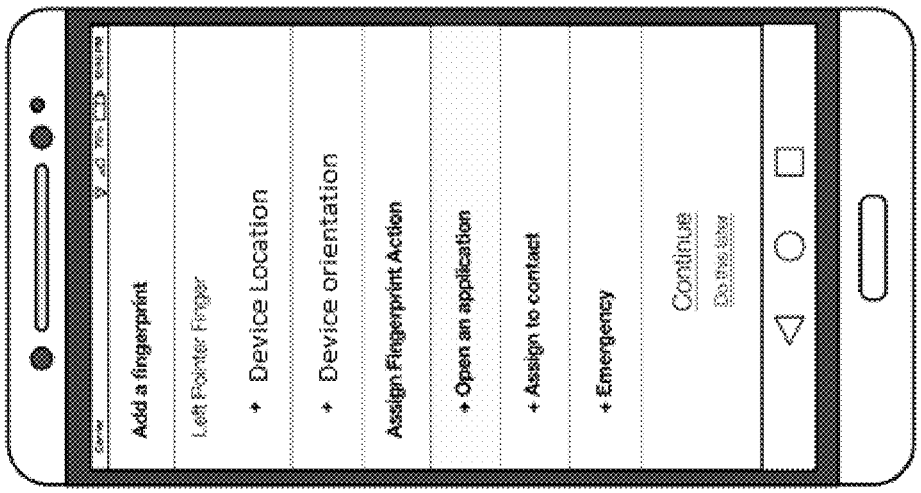

Referring now to FIGS. 5A, 5B and 5C user interfaces of a mobile device for associating a combination of detected fingerprints with an action of the mobile device in accordance with an embodiment are shown. As shown in FIG. 5A, once a fingerprint is captured, the user interface can be used to select the action assigned to various combinations of fingerprints and to one or more characteristics of the mobile device. Although the device location and the device orientation are shown, other characteristics such as the operation state of the device and an identity of a second electronic device in communication with the mobile device can also be used. FIGS. 5B and 5C, respectively, illustrate user interfaces for selection of which application to open and which contact to call based on the identified combination of fingerprints and characteristics of the device.

Figure 6A:
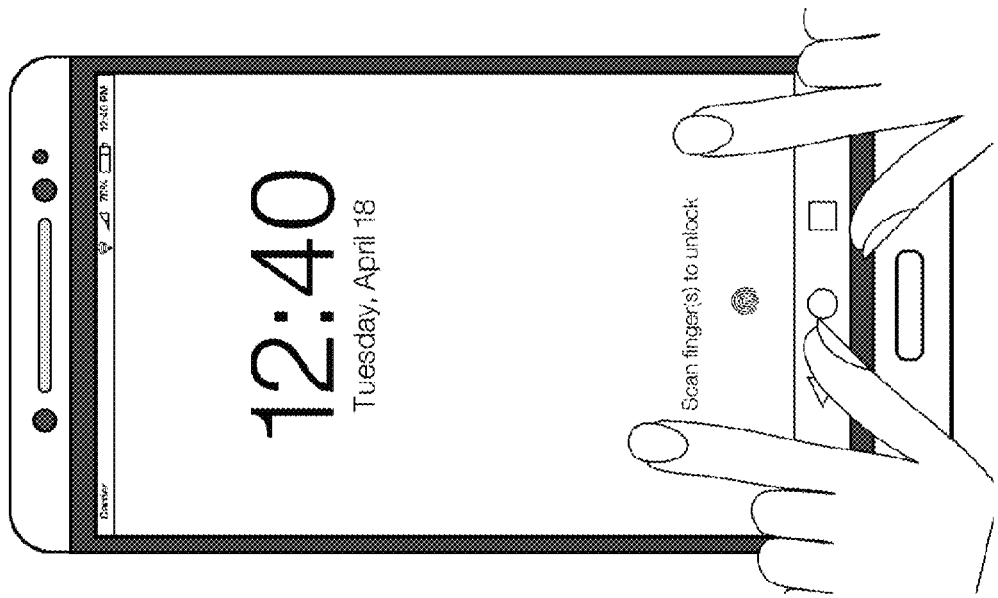
FIGS. 6A and 6B depict user interfaces of a mobile device for receiving an input from a user to instruct the mobile device to perform a specific action in accordance with an embodiment.
Figure 6B:
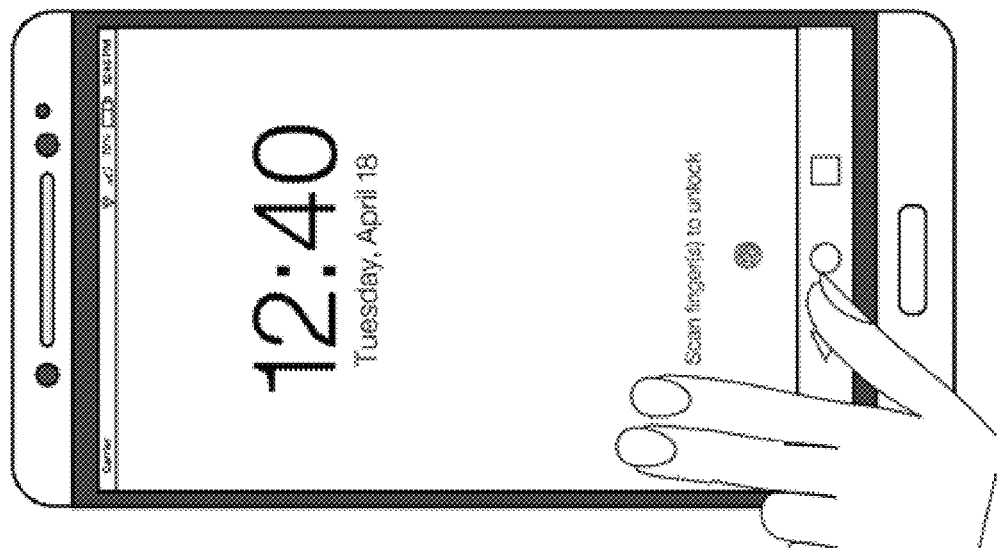

Referring now to FIGS. 6A and 6B user interfaces of a mobile device for receiving an input from a user to instruct the mobile device to perform a specific action in accordance with an embodiment are shown. The mobile devices shown FIGS. 6A and 6B are both in a portrait orientation and their operation state is a locked status. However, the user input being applied are different, FIG. 6A illustrates a left index finger and a left middle finger being placed on the lower left portion of the touchscreen and FIG. 6A illustrates a left index finger being placed on the lower left portion of the touchscreen and a right index finger being placed on the lower right portion of the touchscreen. Accordingly, the mobile devices will unlock and take different actions based on the different user inputs. In one example, a user may configure a specific combination of fingerprints to initiate an emergency call which would offer faster aid to users in distress. In another embodiment, the device can be configured to store multiple family member's fingerprint combinations for use and when a child is detected as using the device the device may only have limited functionality.

Technical effects and benefits include the ability for a mobile device to perform a large number of individually identifiable processing actions while requiring minimal inputs by a user. Use of finger identification or differentiation greatly increases the number of distinct inputs and commands that may be applied to a given input device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling a mobile device based on fingerprint identification, the method comprising:
   detecting an input from a user via an input device of the mobile device, the input including a touch by at least two fingers of a plurality of fingers of a user at a same time;
   determining an operation state of the mobile device at a time of the detected input;
   determining a location of the mobile device at the time of the detected input;
   identifying the at least two fingers used to apply the input by the user based on stored fingerprint data that differentiates between individual fingers of the user;
   identifying a command based on the operational state, the location of the mobile device, and based on the identified at least two fingers, the command identified from a plurality of different commands based on the operational state, the location of the mobile device, and which two fingers of the plurality of fingers are identified; and
   performing an action associated with the identified command.

2. The method of claim 1, further comprising identifying an orientation of the mobile device at the time of the detected input and wherein the command is further identified based on the orientation of the mobile device.

3. The method of claim 1, wherein the operational state of the device includes one of a locked state and an unlocked state.

4. The method of claim 3, wherein the operational state of the device further includes an identification of an active application being executed by the mobile device based when the mobile device is in the unlocked state.

5. The method of claim 1, further comprising identifying a second electronic device in communication with the mobile device at the time of the detected input and wherein the command is further identified based on the second electronic device.

6. The method of claim 5, wherein the second electronic device is one or more of a wearable device, an automobile, and a television.

7. A mobile device for performing a processing action, the mobile device comprising:
   a touch sensor configured to receive an input from a user, the input including a touch by at least two fingers of a plurality of fingers of the user at a same time;
   a finger pattern sensor configured to measure at least part of a fingerprint of the at least two fingers; and
   a processing device configured to perform:
   detecting the input from the user via the touch sensor;
   determining an operation state of the mobile device at a time of the detected input;
   determining a location of the mobile device at the time of the detected input;
   identifying the at least two fingers used to apply the input by the user based on stored fingerprint data that differentiates between individual fingers of the user;
   identifying a command based on the operational state, the location of the mobile device, and based on the identified at least two fingers, the command identified from a plurality of different commands based on the operational state, the location of the mobile device, and which two fingers of the plurality of fingers are identified; and
   performing the processing action associated with the identified command.

8. The mobile device of claim 7, wherein the processing device is further configured to perform identifying an orientation of the mobile device at the time of the detected input and wherein the command is further identified based on the orientation of the mobile device.

9. The mobile device of claim 7, wherein the operational state of the device includes one of a locked state and an unlocked state.

10. The mobile device of claim 9, wherein the operational state of the device further includes an identification of an active application being executed by the mobile device based when the mobile device is in the unlocked state.

11. The mobile device of claim 7, wherein the processing device is further configured to perform identifying a second electronic device in communication with the mobile device at the time of the detected input and wherein the command is further identified based on the second electronic device.

12. The mobile device of claim 11, wherein the second electronic device is one or more of a wearable device, an automobile, and a television.

13. A computer program product for performing a processing action, the computer program product comprising:
   a computer readable storage medium having program instructions embodied therewith, wherein the computer readable storage medium is not a signal, the program instructions readable by a processing circuit to cause the processing circuit to perform a method comprising:
   detecting an input from a user via an input device of a mobile device, the input including a touch by at least two fingers of a plurality of fingers of a user at a same time;
   determining an operation state of the mobile device at a time of the detected input;
   determining a location of the mobile device at the time of the detected input;
   identifying the at least two fingers used to apply the input by the user based on stored fingerprint data that differentiates between individual fingers of the user;
   identifying a command based on the operational state, the location of the mobile device, and based on the identified at least two fingers, the command identified from a plurality of different commands based on the operational state, the location of the mobile device, and which two fingers of the plurality of individual fingers are identified; and
   performing an action associated with the identified command.

14. The computer program product of claim 13, wherein the method further comprises identifying an orientation of the mobile device at the time of the detected input and wherein the command is further identified based on the orientation of the mobile device.

15. The computer program product of claim 13, wherein the operational state of the device includes one of a locked state and an unlocked state.

16. The computer program product of claim 15, wherein the operational state of the device further includes an identification of an active application being executed by the mobile device based when the mobile device is in the unlocked state.

17. The computer program product of claim 13, wherein the method further comprises identifying a second electronic device in communication with the mobile device at the time of the detected input and wherein the command is further identified based on the second electronic device.

\* \* \* \* \*